United States Patent [19]

Kono et al.

[11] Patent Number: 5,433,877

[45] Date of Patent: Jul. 18, 1995

[54] ION-CONDUCTIVE POLYMER ELECTROLYTE

[75] Inventors: Michiyuki Kono, Neyagawa; Shigeo Mori, Nishikyo, both of Japan

[73] Assignee: Dai-Ichi Kogyo Seiyaku Co., Ltd., Kyoto, Japan

[21] Appl. No.: 112,433

[22] Filed: Aug. 26, 1993

[30] Foreign Application Priority Data

Aug. 27, 1992 [JP] Japan ................... 4-228516
Aug. 27, 1992 [JP] Japan ................... 4-228518
Sep. 14, 1992 [JP] Japan ................... 4-244692

[51] Int. Cl.$^6$ ........................................... H01G 9/15
[52] U.S. Cl. ............................. 252/62.2; 429/192
[58] Field of Search ............... 252/62.2, 500, 518, 252/521; 429/192

[56] References Cited

U.S. PATENT DOCUMENTS

| | | | |
|---|---|---|---|
| 4,886,716 | 12/1989 | Roggero et al. | 429/192 |
| 4,908,283 | 3/1990 | Takahashi et al. | 429/192 |
| 4,970,012 | 11/1990 | Kuroda et al. | 252/62.2 |
| 5,098,589 | 3/1992 | Motogami et al. | 429/192 |
| 5,194,490 | 3/1993 | Suga et al. | 429/192 |
| 5,240,791 | 8/1993 | Izuti et al. | 429/192 |
| 5,286,243 | 12/1993 | Noda et al. | 252/62.2 |
| 5,356,553 | 10/1994 | Kono et al. | 252/62.2 |

FOREIGN PATENT DOCUMENTS

| | | |
|---|---|---|
| 0312160 | 4/1989 | European Pat. Off. . |
| 0373116 | 11/1989 | European Pat. Off. . |
| 0460876 | 5/1991 | European Pat. Off. . |
| 55-98480 | 7/1980 | Japan . |
| 61-83249 | 4/1986 | Japan . |
| 62-249361 | 10/1987 | Japan . |
| 63-94501 | 4/1988 | Japan . |
| 3-200865 | 9/1991 | Japan . |

*Primary Examiner*—Prince Willis, Jr.
*Assistant Examiner*—Alan D. Diamond
*Attorney, Agent, or Firm*—Marshall, O'Toole, Gerstein, Murray & Borun

[57] ABSTRACT

Ion-conductive polymer electrolytes prepared by crosslinking organic compounds having the structural formulas (I) and/or (II) to produce a crosslinked organic polymer, then introducing soluble electrolytic salt compounds in the crosslinked organic polymers, $$Z-[-(-CH_2-CH(R^2)-O-)_m-Y]_k \quad (I)$$

$$Z-[-(R^1)_p-(CH_2-CH(R^2)-O-)_m-Y]_k \quad (II)$$

wherein Z is a residual group of an active hydrogen-containing compound; $R^2$ comprises hydrogen, an alkyl group or a phenyl group; k is an integer from 1 through 12; p is an integer from 1 through 220; m is an integer from 1 through 240, and the terminal group Y comprises, in part, an alkyl group, an alkenyl group or an aryl group, and in part a polymerizable functional group; $R^1$ has the structural formula (III), wherein n is an integer from 0 through 25, R comprises an alkyl group, an alkenyl group, an aryl group or an alkylaryl group having from 1 through 20 carbon atoms, are disclosed.

$$-(CH_2-CH-O)- \atop | \atop CH_2-O-(CH_2-CH_2-O)_n-R \quad (III)$$

8 Claims, No Drawings

ION-CONDUCTIVE POLYMER ELECTROLYTE

FIELD OF THE INVENTION

The present invention relates to ionconductive polymer electrolytes. In particular, the present invention relates to ion-conductive polymer electrolytes produced by: (1) polymerizing alkylene oxides, (2) introducing polymerizable functional groups to the terminals of the resulting polyalkylene oxides, (3) crosslinking the terminal-modified polyalkylene oxides to produce crosslinked organic polymers, and (4) introducing soluble electrolytic salt compounds into the crosslinked organic polymers.

BACKGROUND OF THE INVENTION

Ion-conductive polymer electrolytes are known. For example, the following five classes of polymer electrolytes have been disclosed: (1) organic polymer electrolytes of polyethylene oxide (PEO); (2) organic polymer electrolytes produced by doping organic compounds containing a random copolymer of polyethylene oxide and polypropylene oxide in a polyfunctional polyether, with electrolytic salt, and crosslinking the compounds, as disclosed in Japanese Provisional Patent Publication No. SHO-62-249361; (3) solid polymer electrolytes comprising ethylene oxide copolymers containing ionic compounds in a dissolved stated, as disclosed in Japanese Patent Publication No. SHO-61-83249; (4) ion-conductive polymer electrolytes using plastic polymer solid materials comprising essentially thermoplastic homopolymers having no intersecting bonding (e.g., crosslinking) or branch chains of copolymers, as disclosed in Japanese Patent Publication No. SHO-55-98480; and (5) organic polymer electrolytes produced by crosslinking organic compounds having a multifunctional polyether molecular structure after doping said compounds with electrolytes, said polyether molecular structure having side chains having polyether structure, as disclosed in Provisional Patent Publication No. HEI-3-200865.

However, when the conventional ion-conductive polymer electrolytes of the above-described classes (1) through (4) were used in practical applications, for example, as electrolytes for batteries, the ion-conductive polymer electrolytes demonstrated the serious disadvantage of insufficient ionic conductivity. To solve the problem of insufficient conductivity, some investigators attempted to impregnate the conductive polymers with nonaqueous solvents, such as propylene carbonate. The nonaqueous solvents were used in conventional liquid electrolytes for the purpose of improving the conductivity, as disclosed in Japanese Provisional Patent Publication No. SHO-63-94501. The conductivities of the solvent-impregnated solid polymer electrolytes thus obtained approach a sufficient level of conductivity for practical use. Such solvent-impregnated solid polymer electrolytes, however, have the disadvantage that, when the polymer is used at an elevated temperature (i.e., 60° or greater), the solvent evaporates and the performance of the solid polymer electrolytes deteriorates significantly. Moreover, the risk exists in sealed batteries, such as those using metallic lithium, that the nonaqueous solvent can damage the sealing system. Therefore, it is not possible use solvent-impregnated solid polymer electrolytes in large-sized batteries that operate at elevated temperatures.

The crosslinked polymers of above-described class (2) do not flow at relatively high temperatures and have excellent mechanical properties. The crosslinking, however, restrains the movement of segments in their molecular chains. As a result, the ionic conductivity is at most $10^{-4}$ S/cm (Siemens per centimeter) at 80° C. Such ionic conductivities are inadequate for practical applications.

The thermoplastic polymers of the above-described class (4) generally have a higher ionic conductivity relative to the crosslinked polymers of class (2). The thermoplastic polymers however have the disadvantage of a tendency to flow at high temperatures. The conventional ion-conductive polymer electrolytes of above-described classes (1) through (4), therefore, are not satisfactory as electrolytes in large-sized batteries or the like that operate at relatively high temperatures (e.g., 60° C. to 80° C.), such as batteries used for load levelling and in electric vehicles.

The polymer electrolytes of above-described class (5) are crosslinked, and accordingly do not flow at high temperatures. The polymer electrolytes of class (5) have higher ion conductivities relative to the polymer electrolytes of class (2) and are useful in practical applications. However, the polymer electrolytes of class (5) still need much higher conductivities for many applications, such as in batteries.

In view of the above-described disadvantages and drawbacks demonstrated by the prior polymer electrolytes, investigations were conducted to provide ion-conductive polymer electrolytes that have sufficiently high ionic conductivities for use in a variety of practical applications and that are safe even at relatively high temperatures. The present invention is directed to such ion-conductive polymer electrolytes.

SUMMARY OF THE INVENTION

The present invention is directed to ion-conductive polymer electrolytes that have a sufficiently high conductivity for use in a variety of practical applications. More particularly, the present invention is directed to ion-conductive polymer electrolytes comprising a crosslinked organic polymer containing soluble electrolytic salt compounds. The crosslinked organic polymer is prepared by crosslinking terminal-modified polyalkylene oxides, defined hereinafter by structural formula (I), or by crosslinking an organic compound, defined hereinafter by structural formula (II), then introducing soluble electrolytic salt compounds into the crosslinked organic polymer.

DETAILED DESCRIPTION OF THE PREFERRED EMBODIMENTS

In one embodiment, the ion-conductive polymer electrolytes comprise a crosslinked organic polymer prepared by crosslinking a terminal-modified polyalkylene oxide having a mean molecular weight of about 500 to about 50,000, then introducing a soluble electrolytic salt compound into the crosslinked organic polymer. The terminal-modified polyalkylene oxides have the structural formula (I), wherein a portion of the terminal group Y comprises an alkyl group, an alkenyl group or an aryl group, and, the remaining portion is a polymerizable functional group;

$$Z-[-(-CH_2-CH(R^2)-O-)_m-Y]_k \qquad (I)$$

Z is a residual group of an active hydrogen-containing compound; $R^2$ is hydrogen, an alkyl group or a phenyl group; k is an integer from 1 through 12; and m is an integer from 1 through 240.

In another embodiment, the ion-conductive polymer electrolytes comprise a crosslinked organic polymer containing a soluble electrolytic salt compound. The crosslinked organic polymer is prepared by crosslinking an organic compound having the structural formula (II) and a mean molecular weight of about 500 to about 50,000, wherein a portion of the terminal group Y comprises an alkyl group, alkenyl group or an aryl group, and the remaining portion is a polymerizable functional group;

$$Z-[-(R^1)_p-(CH_2-CH(R^2)-O-)_m-Y]_k \qquad (II)$$

Z is a residual group of an active hydrogen-containing compound; $R^2$ is hydrogen, an alkyl group or a phenyl group; k is an integer from 1 through 12; p is an integer from 1 through 220; m is an integer from 1 through 240; and $R^1$ has the structural formula (III), wherein n is an integer from 0 through 25, and R is an alkyl group, an alkenyl group or an aryl group having 1 to about 20 carbon atoms.

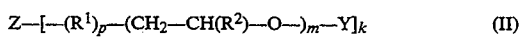
(III)

The terminal-modified polyalkylene oxides having structural formula (I) can be prepared by introducing the terminal group Y, a portion of which comprises an alkyl group, an alkenyl group or an aryl group and a portion of which comprises a polymerizable functional group, to the terminal active hydrogen of the main chain of the polyether compounds. The polyether compounds can be prepared by reacting active hydrogen-containing compounds with alkylene oxides. The mean molecular weight of the terminal-modified polyalkylene oxides of structural formula (I) is about 500 to about 50,000. If the mean molecular weight of the terminal-modified polyalkylene oxides is less than about 500, sufficiently high ion-conductivities cannot be attained for practical applications. If the mean molecular weight of the terminal-modified polyalkyene oxides is greater than about 50,000, it is difficult to purify the polymers.

The ion-conductive polymer electrolytes of the present invention also can be prepared from two or more compounds having the structural formula (I) or (II).

Active hydrogen-containing compounds used in the preparation of compounds having the structural formula (I) or (II) include, for example, alcohols, such as methanol and ethanol; polyhydric alcohols such as ethylene glycol, propylene glycol, 1,4-butanediol, glycerol, trimethylol propane, sorbitol, sucrose and polyglycerol; amine compounds such as butylamine, 2-ethylhexylamine, ethylenediamine, hexamethylenediamine, diethylenetriamine, triethylenetetramine, tetraethylenepentamine, pentaethylenehexamine, aniline, benzylamine and phenylenediamine; phenolic compounds such as bisphenol A, hydroquinone and novolac; and compounds having more than one type of active hydrogen per molecule, such as monoethanolamine and diethanolamine. Polyhydric alcohols are the preferred active hydrogen-containing compounds.

Alkylene oxides used in the preparation of compounds having the structural formulas (I) and (II) include alpha-olefin oxides. Alpha-olefin oxides having from 2 to 9 carbon atoms are preferred. Exemplary, but nonlimiting, alkylene oxides include ethylene oxide, propylene oxide, 1,2-epoxybutane, 1,2-epoxypentane, 1,2-epoxyhexane, 1,2-epoxyheptane, 1,2-epoxyoctane and 1,2-epoxynonane. Alpha-olefin oxides having 10 or more carbon atoms and styrene oxides also can be used. To achieve the full advantage of the present invention, the alkylene oxide is ethylene oxide, propylene oxide or a mixture thereof.

Glycidyl ethers that react with active hydrogen-containing compounds in the preparation of compounds having the structural formula (II) include alkyl-, alkenyl-, aryl- and alkylarylpolyethyleneglycol glycidyl ethers having the structural formula (IV),

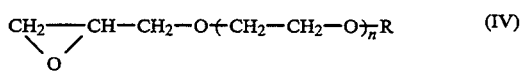
(IV)

wherein n is an integer from 0 to 25, and R is an alkyl group, an alkenyl group, an aryl group or an alkylaryl group having from 1 to about 20 carbon atoms. Typical nonlimiting examples of the R moiety include, for instance, normal chain alkyl groups, such as methyl, ethyl or butyl; branched alkyl groups, such as isopropyl, sec-butyl or tert-butyl; alkenyl groups such as vinyl, allyl, 1-propenyl or 1,3-butadienyl; and aryl or alkylaryl groups such a phenyl, nonylphenyl, tolyl or benzyl. Preferred glycidyl ethers are those wherein n is an integer from 1 to about 15 and R has from 1 to about 12 carbon atoms.

A portion of the terminal group Y of the compounds having the structural formula (I) or structural formula (II) includes an alkyl group, an alkenyl group or an aryl group. The remaining portion of the terminal group Y includes a polymerizable functional group. Of the alkyl group, alkenyl group and aryl group, the alkyl group is particularly preferable. Moreover, of the alkyl groups, the lower alkyl groups, such as methyl and ethyl, are preferred. Preferably, the alkyl, alkenyl or aryl group is present in the terminal group Y in an amount of from 50 to about 98 percent. The polymerizable functional groups of the terminal group Y include an acryloyl group, or a methacryloyl group. The acryloyl group or methacryloyl group is preferred. Preferably, the amount of polymerizable functional groups in the terminal group Y is from 2 to about 50 percent of terminal group Y. If the amount of polymerizable functional group is less than 2 percent of terminal group Y, the resulting ion-conductive polymers have a low mechanical strength. If the amount of polymerizable functional groups is greater than 50 about percent, the resulting ion-conductive polymer electrolytes do not have a sufficiently high ionic conductivity.

The terminal groups Y can be introduced into the compounds of structural formulas (I) or (II) by the following exemplary, but nonlimiting, method. First, after polymerization of the alkylene oxides in the case of the structural formula (I), and after the polymerization of glycidyl ethers and alkylene oxides in the case of structural (II), the alkyl group, alkenyl group or aryl group is introduced to a portion of the hydroxyl groups present at the terminals of the polymer, for example by alkoxylation using an alkyl halide. Next, the polymerizable functional groups are introduced to the remaining hydroxyl groups, for example by esterification.

The resulting organic compounds then were doped with soluble electrolytic salt compounds, as demonstrated below. Then, if desired, a polymerization initiator and/or a sensitizer can be used, and crosslinking is initiated by irradiating with active radiation, such as, for example, light, heat or electron beam, to provide an ion-conductive polymer electrolyte of the present invention. The soluble electrolytic salt compound added to the organic compound comprises at least one of lithium fluoride, lithium chloride, lithium bromide, lithium iodide, lithium nitrate, lithium thiocyanate, lithium perchlorate, lithium trifluoromethanesulfonate, lithium tetraborofluoride, bis-trifluoromethylsulfonylimide lithium, tris-trifluoromethylsulfonylmethid lithium, sodium thiocyanate, sodium perchlorate, sodium trifluoromethanesulfonate, sodium tetraborofluoride, potassium thiocyanate, potassium perchlorate, potassium trifluoromethanesulfonate, potassium tetraborofluoride, magnesium thiocyanate, magnesium perchlorate, and magnesium trifluoromethansulfonate.

It should be understood that in the compounds of structural formula (I) or (II), prior to crosslinking, terminal groups Y comprising both: (1) an alkyl group, alkenyl group or aryl group and (2) a polymerizable functional group can be present in the same polymer molecule. In addition, mixtures of polymers, wherein in the first polymer terminal groups comprise only an alkyl group, an alkenyl group or an aryl group, and in the second polymer the terminal groups comprise only polymerizable functional groups, can be used.

Other ion-conductive polymer electrolytes of the present invention can be prepared by incorporating soluble electrolytic salt compounds into organic polymers, said organic polymers being prepared by crosslinking anyone of the following mixed polymers:

(i) mixed polymers of
  an organic polymer component A comprising an organic compound having the structural formula (II) and a mean molecular weight of about 500 to about 50,000, wherein the terminal group Y is an alkyl group, an alkenyl group or an aryl group, and
  an organic polymer B comprising an organic compound having the structural formula (II) and a mean molecular weight of about 500 to about 50,000, wherein the terminal group Y is an acryloyl group, or an methacryloyl group;

(ii) mixed polymers of
  an organic polymer component C comprising a terminal-modified polyalkylene oxide having the structural formula (I) and a mean molecular weight of about 500 to about 50,000, wherein the terminal group Y is an alkyl group, an alkenyl group or an aryl group, and
  said organic polymer component B;

(iii) mixed polymers of
  an organic polymer component D comprising a terminal-modified polyalkylene oxide having the structural formula (I) and a mean molecular weight of about 500 to about 50,000, wherein the terminal group Y is an acryloyl group, or a methacryloyl group, and
  said organic polymer component A; and (iv) mixed polymers of
  said organic polymer component C, and
  said organic polymer component D.

The above-mentioned organic polymer components A and B having the structural formula (II) can be prepared, like those mentioned above, by reacting active hydrogen-containing compounds with glycidyl ethers and alkylene oxides. The above-mentioned organic polymer components C and D having the structural formula (I) can be prepared by reacting active hydrogen-containing compounds with alkylene oxides. The active hydrogen-containing compounds, glycidyl ethers and alkylene oxides include those compounds described above, respectively.

The preferred mean molecular weight of the above-mentioned organic polymer components A and C, and B and D, is from about 500 to about 50,000. When the molecular weight is less than about 500, sufficiently high conductivities cannot be achieved. When the molecular weight is greater than 50,000, it is difficult to purify the polymers.

The organic polymer components A and C can be prepared as follows. As previously described, the terminal hydroxyl groups of compounds having the structural formula (I) or the structural formula (II) are turned into alcoholates, i.e., alkoxides. Then, the compounds are reacted with, for example an alkyl halide, to modify the terminal group Y into an alkyl group; or similarly, an alkenyl group or an aryl group. The organic polymer components B and D can be prepared as follows. As previously described, the terminal group Y can be modified to include an acryloyl group, or a methacryloyl group by esterification of the unsaturated acid by the terminal hydroxyl groups.

In the mixed polymers comprising two components selected from organic polymer components A, B, C and D, i.e., mixed polymers comprising organic polymer components A and B, organic polymer components C and B, organic polymer components A and C, or organic polymer components C and D, it is preferred that the amount of the first components (i.e., components A or C) of each mixed polymer is from about 50 to about 98 percent (by weight), and the amount of the second components (i.e., components B or D) is from about 2 to about 50 percent (by weight). The reason is that if the crosslinking components B and D are present in an amount exceeding about 50%, the crosslinking density becomes too high and the ionic conductivity drops. On the other hand, if the amount of crosslinking components B and D is less than about 2%, it is not possible to crosslink the organic polymer.

The terminal-modified organic polymer mixtures so prepared are doped with soluble electrolytic salt compounds, as described above. Then, the mixtures are crosslinked, if desired, by adding a polymerization initiator and/or sensitizer and irradiating with active radiation, such as, for example, heat, light or electron beam, to obtain ion-conductive polymer electrolytes according to the present invention.

Since the ion-conductive polymer electrolytes of the present invention comprise organic polymers wherein polyether compounds of specific structures are crosslinked, amorphous phases which contribute to ionic conductivity are stabilized, and high ionic conductivities are exhibited from low temperatures to high temperatures. In addition, because the main chain terminal groups include a sufficient quantity of polymerizable functional groups, an adequate level of mechanical strength can be achieved without lowering the ionic conductivity.

Some preferred embodiments of the present invention are described in the following examples.

EXAMPLE 1

Glycerol was reacted with a mixture of ethylene oxide and propylene oxide (weight ratio of ethylene oxide (EO) to propylene oxide (PO): 4 to 1) in the presence of a catalyst, and a copolymer having a molecular weight of about 8,000 was produced. Sodium methylate (sodium methoxide) (0.72 equivalent) was added to the terminal hydroxyl groups of the copolymer. By removing methanol at 100° C., the terminal hydroxyl groups were converted into alcoholates (alkoxides). Then methyl iodide was added to the reaction mixture, and the mixture was allowed to react at 80° C. for 6 hours to methylate about 70% of the terminal hydroxyl groups. Next, acrylic acid (1.2 equivalents of acrylic acid to the remaining hydroxyl groups), and 50 times (by weight) as much toluene as said acrylic acid, and 0.01 mole % of sulfuric acid were added to the mixture. The resulting mixture was allowed to react at 80°–90° C. for about 8 hours to esterify the remaining hydroxyl groups with acrylic acid. As a result, a terminalmodified polyalkylene oxide wherein about 70% of the terminal groups were methylated and about 30% of the terminal groups were esterified with acrylic acid was obtained.

Lithium perchlorate (0.4 g) and a polymerization initiator (0.006 g, 1-hydroxycyclohexyl phenyl ketone) were added to 3.6 g of the terminal-modified polyalkylene oxide of Example 1 and the mixture was made homogeneous. Then the resulting solution was poured over a glass plate, and was irradiated by ultraviolet rays in 7 mW/cm$^2$ in strength of a nitrogen atmosphere. As a result, an ion-conductive polymer electrolyte, having a thickness of 50 μm, was obtained.

EXAMPLE 2

Glycerol was reacted with a mixture of ethylene oxide (EO) and propylene oxide (PO) (weight ratio of EO to PO: 9 to 1) in the presence of a catalyst, and a copolymer having a molecular weight of about 8,000 was produced. Sodium methylate (0.87 equivalent) was added to the terminal hydroxyl groups of the copolymer. By removing methanol at 100° C., the terminal hydroxyl groups were converted into alcoholates. Then methyl iodide was added to the reaction mixture, and the mixture was allowed to react at 80° C. for 6 hours to methylate about 85% of the terminal hydroxyl groups. Next, acrylic acid (1.2 equivalents of acrylic acid to the remaining hydroxyl groups), 50 times (by weight) as much toluene as said acrylic acid, and 0.01 mole % of sulfuric acid were added to the mixture. The resulting mixture was allowed to react at 80°–90° C. for about 8 hours to esterify the remaining hydroxyl groups with acrylic acid. As a result, a terminal-modified polyalkylene oxide wherein about 85% of the terminal groups methylated and about 15% of the terminal groups were esterified with acrylic acid was obtained.

Lithium perchlorate (0.4 g) and a polymerization initiator (0.006 g, 1-hydroxycyclohexyl phenyl ketone) were added to 3.6 g of the terminal-modified polyalkylene oxide of Example 2, and the mixture was made homogeneous. Then the resulting solution was poured over a glass plate, and was irradiated by ultraviolet rays of 7 mW/cm$^2$ in strength in a nitrogen atmosphere. As a result, an ion-conductive polymer electrolyte, having a thickness of 50 μm, was obtained.

EXAMPLE 3

Glycerol was reacted with a mixture of ethylene oxide and propylene oxide (weight ratio of EO to PO: 9 to 1) in the presence of a catalyst, and a copolymer having a molecular weight of about 9,000 was produced. Sodium methylate (0.92 equivalent) was added to the terminal hydroxyl groups of the copolymer. By removing methanol at 100° C., the terminal hydroxyl groups were converted into alcoholates. Then methyl iodide was added to the reaction mixture, and the mixture was allowed to react at 80° C. for 6 hours to methoxylate about 90% of the terminal hydroxy groups. Next, acrylic acid (1.2 equivalents of acrylic acid to the remaining hydroxyl groups), 50 times (by weight) as much toluene as said acrylic acid, and 0.01 mole % of sulfuric acid were added to the mixture. The resulting mixture was allowed to react at 80°–90° C. for 8 hours to esterify the remaining hydroxyl groups with acrylic acid. As a result, a terminal-modified polyalkylene oxide wherein about 90% of the terminal groups were methylated and about 10% terminal groups were esterified with acrylic acid was obtained.

Lithium perchlorate (0.4 g) and a polymerization initiator (0.006 g, 1-hydroxycyclohexyl phenyl ketone) were added to 3.6 g of the terminal-modified polyalkylene oxide of Example 3, and the mixture was made homogeneous. Then the resulting solution was poured over a glass plate, and was irradiated by ultraviolet rays of 7 mW/cm$^2$ in strength in a nitrogen atmosphere. As a result, an ion-conductive polymer electrolyte, having a thickness of 50 μm, was obtained.

EXAMPLE 4

Glycerol was reacted with ethylene oxide in the presence of a catalyst, and a polymer having a molecular weight of about 5,000 was produced. Sodium methylate (0.85 equivalent) was added to the terminal hydroxyl groups of the polymer. By removing methanol at 100° C., the terminal hydroxyl groups were converted into alcoholates. Then methyl iodide was added to the reaction mixture, and the mixture was allowed to react at 80° C. for 6 hours to methylate about 85% of the terminal hydroxyl groups. Next, acrylic acid (1.2 equivalents of acrylic acid to the remaining hydroxyl groups), 50 times (by weight) as much toluene as said acrylic acid, and 0.01 mole % of sulfuric acid were added to the mixture. The resulting mixture was allowed to react at 80°–90° C. for 8 hours to esterify the remaining hydroxyl groups. As a result, a terminal-modified polyalkylene oxide wherein about 85% of the terminal groups were methylated and about 15% of the terminal groups were esterified with acrylic acid was obtained.

Lithium perchlorate (0.4 g) and a polymerization initiator (0.006 g, 1-hydroxycyclohexyl phenyl ketone) were added to 3.6 g of the terminal-modified polyethylene oxide of Example 4, and the mixture was made homogeneous. Then the resulting solution was poured over a glass plate, and was irradiated by ultraviolet rays of 7 mW/cm$^2$ in strength in a nitrogen atmosphere. As a result, an ion-conductive polymer electrolyte, having a thickness of 50 μm, was obtained.

EXAMPLE 5

Glycerol was reacted with a mixture of ethylene oxide and 1,2-epoxybutane (BO) (weight ratio of EO to BO: 85 to 15) in the presence of a catalyst, and a polymer having a molecular weight of about 7,000 was produced. Sodium methylate (0.6 equivalent) was added to the terminal hydroxyl groups of the copolymer. By removing methanol at 100° C., the terminal hydroxyl groups were converted into alcoholates. Then methyl iodide was added to the reaction mixture, and the mixture was allowed to react at 80° C. for 6 hours to methylate about 60% of the terminal hydroxyl groups. Next, acrylic acid (1.2 equivalents of acrylic acid to the remaining hydroxyl groups), 50 times (by weight) as much toluene as said acrylic acid, and 0.01 mole % of sulfuric acid were added to the mixture. The resulting mixture was allowed to react at 80°–90° C. for 8 hours. As a result, a terminal-modified polyalkylene oxide wherein about 60% of the terminal groups were methylated and about 40% of the terminal groups were esterified with acrylic acid was obtained.

Lithium perchlorate (0.4 g) and a polymerization initiator (0.006 g, 1-hydroxycyclohexyl phenyl ketone) were added to 3.6 g of the terminal-modified polyalkylene oxide of Example 5, and the mixture was made homogeneous. Then the resulting solution was poured over a glass plate, and was irradiated by ultraviolet rays of 7 mW/cm$^2$ in strength in a nitrogen atmosphere. As a result, an ion-conductive polymer electrolyte, having a thickness of 50 μm, was obtained.

EXAMPLE 6

Lithium perchlorate (0.4 g) and a polymerization initiator (0.006 g, 1-hydroxycyclohexyl phenyl ketone) were added to 1.8 g of the terminal-modified polyalkylene oxide of Example 1 and to 1.8 g of the terminal-modified polyalkyene oxide of Example 3, the mixture was made homogeneous. Then the resulting solution was poured over a glass plate, and was irradiated by ultraviolet rays of 7 mW/cm$^2$ in strength in a nitrogen atmosphere. As a result, an ion-conductive polymer electrolyte, having a thickness of 50 μm, was obtained.

EXAMPLE 7

Propylene carbonate (0.6 g) and lithium perchlorate (0.5 g) were added to 3.0 g of the terminal-modified polyalkylene oxide of Example 1, and the mixture was made homogeneous. Then the resulting solution was poured over a glass plate, and was irradiated by an electron beam with an electron-curtain type electron-beam irradiator (output: 200 kV; absorbed dose: 5 Mrad) in a nitrogen atmosphere. As a result, an ion-conductive polymer electrolyte, having a thickness of 20 μm, was obtained.

Comparative Example 1

An ion-conductive polymer electrolyte was prepared in an identical manner to the ion-conductive polymer electrolyte by the method of Example 1, except the terminal groups of the polyalkyleneoxide of Example 1 were 100% esterified with acrylic acid.

Lithium Ion Conductivity Test

To measure ion conductivities of the ion-conductive polymer electrolytes of Examples 1 through 7 and Comparative Example 1, each polymer electrolyte was placed between platinum plates, the A.C. impedance between the electrodes was measured, and a complex impedance analysis was made. The results are summarized in Table 1. The measuring instrument was an impedance analyzer, Model 4192A of Yokogawa-Hewlett-Packard. The measuring conditions were: applied voltage = 10 mV; measuring frequency = 5 Hz–13 MHz.

TABLE 1

| Example | Ionic Conductivity (S/cm) | | |
|---|---|---|---|
| | 80° C. | 40° C. | 25° C. |
| 1 | $1.10 \times 10^{-3}$ | $1.4 \times 10^{-4}$ | $4.1 \times 10^{-5}$ |

TABLE 1-continued

| | Ionic Conductivity (S/cm) | | |
|---|---|---|---|
| | 80° C. | 40° C. | 25° C. |
| 2 | $0.90 \times 10^{-3}$ | $1.5 \times 10^{-4}$ | $5.2 \times 10^{-5}$ |
| 3 | $0.89 \times 10^{-3}$ | $1.2 \times 10^{-4}$ | $4.0 \times 10^{-5}$ |
| 4 | $1.20 \times 10^{-3}$ | $1.8 \times 10^{-4}$ | $3.8 \times 10^{-5}$ |
| 5 | $0.88 \times 10^{-3}$ | $1.5 \times 10^{-4}$ | $4.9 \times 10^{-5}$ |
| 6 | $0.76 \times 10^{-3}$ | $1.1 \times 10^{-4}$ | $2.9 \times 10^{-5}$ |
| 7 | $2.10 \times 10^{-3}$ | $5.8 \times 10^{-4}$ | $6.8 \times 10^{-5}$ |
| Comparative Example 1 | $1.00 \times 10^{-4}$ | $3.5 \times 10^{-5}$ | $1.0 \times 10^{-5}$ |

From the data summarized in Table 1, it is clear that the ion-conductive polymer electrolytes of Examples 1 through 7 have excellent ionic conductivities. In particular, the ion-conductive polymer of Examples 1 through 7 show excellent ionic conductivities at relatively high temperatures.

EXAMPLE 8

A mixture of glycerol (18 g), methyldiethyleneglycol glycidyl ether (730 g) having the following structural formula (V), and ethylene oxide (182 g) was allowed to react in the presence of a catalyst (2 g potassium hydroxide). Then, after standard desalting and purification process steps, a polyether (876 g) having a molecular weight of about 4,700 (calculated from the hydroxyl value) was obtained.

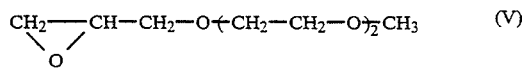
(V)

Sodium methylate (0.72 equivalent) was added to the terminal hydroxyl groups of the polyether. By removing methanol at 100° C., the terminal hydroxyl groups were converted into alcoholates. Then methyl iodide was added to the reaction mixture, and the mixture was allowed to react at 80° C. for 6 hours to methylate about 70% of the terminal hydroxyl groups. Next, acrylic acid (1.1 equivalents of acrylic acid to the remaining hydroxyl groups), 20 times (by weight) as much toluene as said acrylic acid, and 0.01 mole % of sulfuric acid were added to the mixture. The mixture was allowed to react at 80°–90° C. for 8 hours to esterify the remaining hydroxyl groups. As a result, a polyether wherein about 70% of the terminal groups were methylated and about 30% of the terminal groups were esterified with acrylic acid was obtained.

Lithium perchlorate (0.4 g) and a polymerization initiator (0.02 g, 1-hydroxycyclohexyl phenyl ketone) were added to 3.6 g of the terminal-modified polyalkylene oxide of Example 8, and the mixture was made homogeneous. Then the resulting solution was poured over a glass plate, and was irradiated by ultraviolet rays of 7 mW/cm$^2$ in strength in a nitrogen atmosphere. As a result, an ion-conductive polymer electrolyte, having a thickness of 50 μm, was obtained.

EXAMPLE 9

A mixture of glycerol (18 g), methyldiethylene glycolglycidyl ether (730 g) having the structural formula (V), and ethylene oxide (182 g) was allowed to react in the presence of a catalyst (2 g potassium hydroxide). Then, after standard desalting and purification process steps, a polyether (876 g) having a molecular weight of about 4,700 (calculated from the hydroxyl value) was obtained.

Sodium methylate (0.91 equivalent) was added to the hydroxyl groups of the polyether. By removing methanol at 100° C., the terminal hydroxyl groups were converted into alcoholates. Then methyl iodide was added to the reaction mixture, and the mixture was allowed to react at 80° C. for 6 hours to methylate about 90% of the terminal hydroxyl groups. Next, acrylic acid (1.1 equivalents of acrylic acid to the remaining hydroxyl groups), 20 times (by weight) as much toluene as said acrylic acid, and 0.01 mole % of sulfuric acid were added to the mixture, and the mixture was allowed to react at 80°-90° C. for 8 hours to esterify the remaining hydroxyl groups. As a result, a polyether wherein about 90% of the terminal groups were methylated and about 10% of the terminal groups were esterified with acrylic acid was obtained.

Lithium perchlorate (0.4 g) and a polymerization initiator (0.02 g, 1-hydroxycyclohexyl phenyl ketone) were added to 3.6 g of the terminal-modified polyether of Example 9, and the mixture was made homogeneous. Then the solution was poured over a glass plate, and was irradiated by ultraviolet rays of 7 mW/cm² in strength in a nitrogen atmosphere for two minutes. As a result, an ion-conductive polymer electrolyte, having a thickness of 50 μm, was obtained.

EXAMPLE 10

A mixture of sorbitol (20 g), methyltriethyleneglycol glycidyl ether (1320 g) having the following structure formula (VI), and ethylene oxide (30 g) was allowed to react in the presence of a catalyst (2.7 g of potassium hydroxide). Then standard desalting and purification process steps were conducted. As a result, a polyether (1251 g) having a molecular weight of about 12,300 (calculated from the hydroxyl value) was obtained.

This polyether is a compound having the structural formula (II) wherein R¹ is a moiety having the structural formula (III), wherein R is a methyl group; Z has the structural formula (VII), p=3, m=9, Y=H, k=6 and n=1.

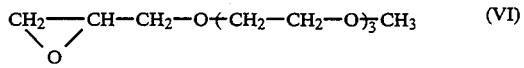

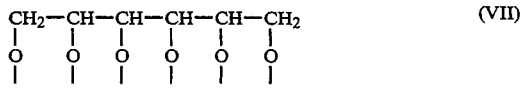

Sodium methylate (0.82 equivalent) was added to the hydroxyl group of the polyether. By removing methanol at 100° C., the terminal hydroxyl groups were converted into alcoholates. Then methyl iodide was added to the reaction mixture, and the mixture was allowed to react at 80° C. for 6 hours to methylate about 80% of the terminal hydroxyl groups. Next, acrylic acid (1.1 equivalents of acrylic acid to the remaining hydroxyl groups), 20 times (by weight) as much toluene as said acrylic acid, and 0.01 mole % of sulfuric acid were added to the mixture, and the mixture was allowed to react at 80°-90° C. for 8 hours to esterify the remaining hydroxyl groups. As a result, a polyether wherein about 80% of the terminal groups were methylated and about 20% of the terminal groups were esterified with acrylic acid was obtained.

Lithium perchlorate (0.4 g) and a polymerization initiator (0.02 g, 1-hydroxycyclohexyl phenyl ketone) were added to 3.6 g of the terminal-modified polyether of Example 10, and the mixture was made homogeneous. Then the resulting solution was poured over a glass plate, and was irradiated by ultraviolet rays of 7 mW/cm² in strength in a nitrogen atmosphere for two minutes. As a result, an ion-conductive polymer electrolyte, having a thickness of 50 μm, was obtained.

EXAMPLE 11

A mixture of ethylenediamine (20 g), phenylhexaethyleneglycol glycidyl ether (5520 g) having the following structural formula (VIII) and ethylene oxide (1173 g) was allowed to react in the presence of a catalyst (9.4 g of potassium hydroxide). Then standard desalting and purification process steps were conducted. As a result, a polyether (6590 g) having a molecular weight of about 19,920 (calculated from the hydroxyl number) was obtained.

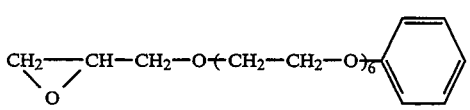

Sodium methylate (0.85 equivalent) was added to the hydroxyl groups of the polyether. By removing methanol at 100° C., the terminal hydroxyl groups were converted into alcoholates. Then methyl iodide was added to the reaction mixture, and the mixture was allowed to react at 80° C. for 6 hours to methylate about 85% of the terminal hydroxyl groups. Next, acrylic acid (1.1 equivalents of acrylic acid to the remaining hydroxyl groups), 20 times (by weight) as much toluene as said acrylic acid, and 0.01 mole % of sulfuric acid were allowed to react at 80°-90° C. for 8 hours to esterify the remaining hydroxyl groups. As a result, a polyether wherein about 85% of the terminal groups were methylated and about 15% of the terminal groups were esterified with acrylic acid was obtained.

Lithium perchlorate (0.4 g) and a polymerization initiator (0.02 g, 1-hydroxycyclohexyl phenyl ketone) were added to 3.6 g of the terminal-modified polyether of Example 11, and the mixture was made homogeneous. Then the resulting solution was poured over a glass plate, and was irradiated by ultraviolet rays of 7 mW/cm² in strength in a nitrogen atmosphere for two minutes. As a result, an ion-conductive polymer electrolyte, having a thickness of 50 μm, was obtained.

EXAMPLE 12

A mixture of pentamethylenehexamine (30 g), methyltriethyleneglycol glycidyl ether (480 g) having the structural formula (VI) and ethylene oxide (460 g) was allowed to react in the presence of a catalyst (6.9 g potassium hydroxide). Then standard desalting and purification process steps were conducted. As a result, a polyether (850 g) having a molecular weight of about 7,250 (calculated from the hydroxyl value was obtained.

The polyether was a compound having the structural formula (II), wherein R¹ is a moiety having the structural formula (III), wherein R is a methyl group; Z has the following structural formula (IX); p=3; m=2; Y=H; k=8; and n=10.

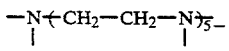

(IX)

ity of Examples 1 through 7 and Comparative Example 1.

TABLE 2

| | Ionic Conductivity (S/cm) | | | | Ionic Conductivity after 100 days at 100° C. (S/cm) |
|---|---|---|---|---|---|
| | 80° C. | 60° C. | 40° C. | 25° C. | 25° C. |
| Example | | | | | |
| 8 | $1.0 \times 10^{-3}$ | $7.0 \times 10^{-4}$ | $3.5 \times 10^{-4}$ | $8.0 \times 10^{-5}$ | $7.9 \times 10^{-5}$ |
| 9 | $0.9 \times 10^{-3}$ | $6.0 \times 10^{-4}$ | $3.0 \times 10^{-4}$ | $5.0 \times 10^{-5}$ | $5.0 \times 10^{-5}$ |
| 10 | $1.1 \times 10^{-3}$ | $7.0 \times 10^{-4}$ | $3.0 \times 10^{-4}$ | $6.0 \times 10^{-5}$ | $6.0 \times 10^{-5}$ |
| 11 | $2.0 \times 10^{-3}$ | $8.0 \times 10^{-4}$ | $5.0 \times 10^{-4}$ | $7.0 \times 10^{-5}$ | $7.0 \times 10^{-5}$ |
| 12 | $1.0 \times 10^{-3}$ | $6.0 \times 10^{-4}$ | $5.2 \times 10^{-4}$ | $6.5 \times 10^{-5}$ | $6.0 \times 10^{-5}$ |
| Comparative Example 2 | $1.0 \times 10^{-4}$ | $7.0 \times 10^{-5}$ | $1.0 \times 10^{-4}$ | $8.0 \times 10^{-6}$ | $6.0 \times 10^{-6}$ |

Sodium methylate (0.51 equivalent) was added to the hydroxyl groups of the polyether. By removing methanol at 100° C., the terminal hydroxyl groups were converted into alcoholates. Then methyl iodide was added to the reaction mixture, and the mixture was allowed to react at 80° C. for 6 hours to methylate about 50% of the terminal hydroxyl groups. Next, acrylic acid (1.1 equivalents of acrylic acid to the remaining hydroxyl groups), 20 times (by weight) as much toluene as said acrylic acid, and 0.01 mole % of sulfuric acid were allowed to react at 80°–90° C. for 8 hours to esterify the remaining hydroxyl groups. As a result, a polyether wherein about 50% of the terminal groups were methylated and about 50% of the terminal groups were esterified with acrylic acid was obtained.

Lithium perchlorate (0.4 g) and a polymerization initiator (0.02 g, 1-hydroxycyclohexyl phenyl ketone) were added to 3.6 g of the terminal-modified polyether of Example 12, and the mixture was made homogeneous. Then the solution was poured over a glass plate, and was irradiated by ultraviolet rays of 7 mW/cm² in strength in a nitrogen atmosphere for two minutes. As a result, an ion-conductive polymer electrolyte, having a thickness of 50 μm, was obtained.

COMPARATIVE EXAMPLE 2

In place of the polyether having a molecular weight of 4,700, a random polyether of ethylene oxide and propylene oxide (EO to PO ratio: 8 to 2) having a mean molecular weight of about 3,000 was used to prepare a polyether wherein the terminals were completely esterified with acrylic acid. Otherwise, a method identical to the preparation of Example 8 was used to prepare the comparative ion-conductive polymer electrolyte.

Lithium Ion Conductivity Test

To measure ionic conductivities of the ion-conductive polymer electrolytes of Examples 8 through 12 and Comparative Example 2, each polymer electrolyte was placed between platinum plates, the A.C. impedance between the electrodes was measured, and complex impedance analysis was made. The results are summarized in Table 2. The ionic conductivities of said electrolytes after storage at 100° C. in a sealed condition for 100 days also are summarized in Table 2. The measuring instruments and the measuring conditions are identical to those listed above with respect to the ion conductivity of Examples 1 through 7 and Comparative Example 1.

From the data summarized in Table 2, it is clear that the ion-conductive polymer electrolytes of Examples 8 through 12 have excellent ionic conductivities. In particular, the ion-conductive polymers of Examples 8 through 12 have excellent ionic conductivities at relatively high temperatures.

EXAMPLE 13

A mixture of glycerol (18 g), methyldiethyleneglycol glycidyl ether (730 g) having the structural formula (V), and ethylene oxide (182 g) was allowed to react in the presence of a catalyst (2 g of potassium hydroxide). Then standard desalting and purification process steps were conducted. As a result, a polyether (876 g) having a molecular weight of about 4,700 (calculated from the hydroxyl value) was obtained.

Sodium methylate (1.1 equivalent) was added to the hydroxyl groups of the polyether. By removing methanol at 100° C., the terminal hydroxyl groups were converted into alcoholates. Then methyl iodide was added to the reaction mixture, and the mixture was allowed to react at 80° C. for 6 hours to methylate the terminal hydroxyl groups. The resulting compound was denoted "Compound A-1", and corresponds to the organic polymer component A.

Glycerol and a mixture of ethylene oxide and propylene oxide (weight ratio EO to PO=4 to 1) were allowed to react in the presence of a catalyst to prepare a copolymer having a molecular weight of about 8,000. Acrylic acid (1.2 equivalents of acrylic acid to the terminal hydroxyl groups of the copolymer), was added and the copolymer was allowed to react with 50 times (by weight) as much toluene as said acrylic acid and 0.01 mole % of sulfuric acid at 110° C. for 8 hours. As a result, terminal acryloyl-modified polyalkylene oxide was obtained. The resulting compound was designated "Compound D-1", and corresponds to the organic polymer component D.

Lithium perchlorate (0.4 g) and a polymerization initiator (0.006 g, 1-hydroxycyclohexyl phenyl ketone) were added to a mixture of 3.0 g of the "Compound A-1" and 0.6 g of the "Compound D-1", and the mixture was made homogeneous. Then the resulting solution was poured over a glass plate, and was irradiated by ultraviolet rays of 7 mW/cm² in strength in a nitrogen atmosphere for two minutes. As a result, an ion-conductive polymer electrolyte, having a thickness of 50 μm, was obtained.

EXAMPLE 14

Diethyleneglycol was allowed to react with a mixture of ethylene oxide and propylene oxide (EO to PO weight ratio=4 to 1) in the presence of a catalyst to prepare a copolymer having a molecular weight of about 3,000. Sodium methylate (1.1 equivalent) was added to the terminal hydroxyl groups of the copolymer. By removing methanol at 100° C. under reduced pressure conditions, the terminal hydroxyl groups were converted into alcoholates. Then methyl iodide was added to the reaction mixture, and the mixture was allowed to react at 80° C. for 6 hours to obtain a terminal methylatedmodified polyalkylene oxide. The resulting compound was denoted "Compound C-2", and corresponds to the organic polymer component C.

Lithium perchlorate (0.4 g) and a polymerization initiator (0.02 g, 1-hydroxycyclohexyl phenyl ketone) were added to a mixture of 3.2 g of the "Compound C-2" and to 0.4 g of the "Compound D-1" synthesized by the method of Example 13, and the mixture was made homogeneous. Then the resulting solution was poured over a glass plate, and was irradiated by ultraviolet rays of 7 mW/cm$^2$ in strength in a nitrogen atmosphere for two minutes. As a result, an ion-conductive polymer electrolyte, having a thickness of 50 µm, was obtained.

EXAMPLE 15

A mixture of ethylenediamine (20 g), phenylhexaethyleneglycol glycidyl ether (5520 g) and ethylene oxide (1173 g) was allowed to react in the presence of a catalyst (9.4 g of potassium hydroxide). After standard desalting and purification process steps, a polyether (6590 g) having a molecular weight of about 19,920 (calculated from the hydroxyl value) was obtained.

Acrylic acid (1.1 equivalents of acrylic acid to the terminal hydroxyl groups of the polyether), 20 times (by weight) as much toluene as said acrylic acid and 0.01 mole % of sulfuric acid were added to the mixture. The resulting mixture was allowed to react at 80°-90° C. for 8 hours to obtain a terminal acryloyl-modified organic polymer. The resulting compound was designated "Compound B-2", and corresponds to the organic polymer component B.

Lithium perchlorate (0.4 g) and a polymerization initiator (0.02 g, 1-hydroxycyclohexyl phenyl ketone) were added to a mixture of 0.7 g of the "Compound B-2" and 2.9 g of the "Compound C-2" prepared by the method of Example 14, and the mixture was made homogeneous. Then the resulting solution was poured over a glass plate, and was irradiated by ultraviolet rays of 7 mW/cm$^2$ in strength in a nitrogen atmosphere for two minutes. As a result, an ion-conductive polymer electrolyte, having a thickness of 50 µm, was obtained.

EXAMPLE 16

Lithium perchlorate (0.4 g) and a polymerization initiator (0.02 g, 1-hydroxycyclohexyl phenyl ketone) were added to a mixture of 3.1 g of the "Compound A-1" synthesized by the method of Example 13 and 0.5 g of the "Compound B-2" synthesized by the method of Example 15, and the mixture was made homogeneous. The resulting solution was poured over a glass plate, and was irradiated by ultraviolet rays of 7 mW/cm$^2$ in strength in a nitrogen atmosphere for two minutes. As a result, an ion-conductive polymer electrolyte, having a thickness of 50 µm, was obtained.

COMPARATIVE EXAMPLE 3

Lithium perchlorate (0.4 g) and a polymerization initiator (0.006 g, 1-hydroxycyclohexyl phenyl ketone) were added to 3.6 g of the "Compound D-1" synthesized by the method of Example 13, and the mixture was made homogeneous. The resulting solution was poured over a glass plate, and was irradiated by ultraviolet rays of 7 mW/cm$^2$ in strength in a nitrogen atmosphere. As a result, an ion-conductive polymer electrolyte, of 50 µm thickness, was obtained.

COMPARATIVE EXAMPLE 4

Lithium perchlorate (0.4 g) and a polymerization initiator (0.006 g, 1-hydroxycyclohexyl phenyl ketone) were added to 3.6 g of the "Compound B-2" synthesized by the method of Example 15, and the mixture was made homogeneous. The resulting solution was poured over a glass plate, and was irradiated by ultraviolet rays of 7 mW/cm$^2$ in strength in a nitrogen atmosphere. As a result, an ion-conductive polymer electrolyte, of 50 µm thickness, was obtained.

Lithium Ion Conductivity Test

To measure the ionic conductivities of the ion-conductive polymer electrolytes of Examples 13 through 16 and Comparative Examples 3 and 4, each polymer electrolyte was placed between platinum plates, the A.C. impedance between the electrodes was measured, and complex impedance analysis was made. The results are summarized in Table 3. The measuring instruments and the measuring conditions are identical to those listed above with respect to the ion conductivity of Examples 1 through 7.

TABLE 3

| | Ionic Conductivity (S/cm) | | |
|---|---|---|---|
| | 80° C. | 40° C. | 25° C. |
| Examples | | | |
| 13 | $0.72 \times 10^{-3}$ | $1.50 \times 10^{-4}$ | $5.00 \times 10^{-5}$ |
| 14 | $0.98 \times 10^{-3}$ | $2.10 \times 10^{-4}$ | $6.10 \times 10^{-5}$ |
| 15 | $1.40 \times 10^{-3}$ | $5.10 \times 10^{-4}$ | $6.00 \times 10^{-5}$ |
| 16 | $2.10 \times 10^{-3}$ | $3.30 \times 10^{-4}$ | $4.50 \times 10^{-5}$ |
| Comparative Examples | | | |
| 3 | $1.00 \times 10^{-4}$ | $3.50 \times 10^{-5}$ | $1.00 \times 10^{-5}$ |
| 4 | $2.10 \times 10^{-4}$ | $5.00 \times 10^{-5}$ | $9.00 \times 10^{-6}$ |

From the data summarized in Table 3, it is clear that ion-conductive polymer electrolytes of Example 13 through 16 have excellent ionic conductivities. In particular, the ion-conductive polymers of Examples 13 through 16 demonstrate excellent ionic conductivities at relatively high temperatures.

In contrast, the polymers of Comparative Examples 3 and 4 have low ionic conductivities since the polymers of Comparative Examples 3 and 4 comprise crosslinking components only, and have excessively high crosslinking densities.

What is claimed is:

1. An ion-conductive polymer electrolyte produced by:

(a) crosslinking a terminal-modified polyalkylene oxide having the structural formula

and having a mean molecular weight of about 500 to about 50,000 to produce an organic polymer, and (b) introducing a soluble electrolytic salt compound in said organic polymer, wherein at least some, but less than all, of the terminal Y groups of the terminal-modified polyalkylene oxide are an alkyl group and the remaining terminal Y groups are a polymerizable functional group selected from the group consisting of an acryloyl group or a methacryloyl group; Z is a residual group of an active hydrogen-containing compound; $R^2$ comprises hydrogen, an alkyl group or a phenyl group; k is an integer from 3 through 12; and m is an integer from 1 through 240.

2. The ion-conductive polymer electrolyte of claim 1 wherein $R^2$ comprises hydrogen or methyl.

3. The ion-conductive polymer electrolyte of claim 1 wherein the terminal group Y comprises from about 50 to about 98% by weight of an alkyl group, and about 2 to about 50% by weight of said polymerizable functional group.

4. the ion-conductive polymer electrolyte of claim 1 wherein the terminal-modified polyalkylene oxide is crosslinked by adding a polymerization initiator, a sensitizer or a mixture thereof to the terminal-modified polyalkylene oxide, then irradiating the resulting mixture with active radiation.

5. An ion-conductive polymer electrolyte produced by:

(a) crosslinking an organic compound having the structural formula

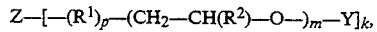

and having a mean molecular weight of about 500 to about 50,000 to produce an organic polymer; and (b) introducing a soluble electrolytic salt compound in said organic polymer, wherein at least some, but less than all, of the terminal Y groups are an alkyl group and the remaining terminal Y groups are a polymerizable functional group selected from the group consisting of an acryloyl group or a methacryloyl group; Z is a residual group of an active hydrogen-containing compound; $R^2$ comprises hydrogen, an alkyl group or a phenyl group; k is an integer from 3 through 12; p is an integer from 1 through 220; m is an integer from 1 through 240; and $R^1$ is a group having the structural formula

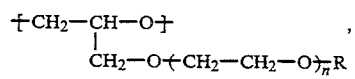

wherein n is an integer from 0 through 25, R is an alkyl group, an alkenyl group, an aryl group or an alkylaryl group having from 1 through about 20 carbon atoms.

6. The ion-conductive polymer electrolyte of claim 5 wherein $R^2$ comprises hydrogen or a methyl group.

7. The ion-conductive polymer electrolyte of claim 5 wherein the terminal group Y comprises about 50 to about 98% by weight of an alkyl group, and about 2 to about 50% by weight of said polymerizable functional group.

8. The ion-conductive polymer electrolyte of claim 5 wherein said organic compound is crosslinked by adding a polymerization initiator, a sensitizer or a combination thereof to the organic compound, and irradiating the resulting mixture with active radiation.

* * * * *

UNITED STATES PATENT AND TRADEMARK OFFICE
CERTIFICATE OF CORRECTION

PATENT NO. : 5,433,877
DATED : July 18, 1995
INVENTOR(S) : Michiyuki Kono et al.

It is certified that error appears in the above-identified patent and that said Letters Patent is hereby corrected as shown below:

Column 4, line 50, "than 50 about" should be --than about 50--.

Column 12, line 63, "value was" should be --value) was--.

Column 17, line 23, "the ion-conductive" should be --The ion-conductive--.

Signed and Sealed this

Twenty-first Day of May, 1996

Attest:

BRUCE LEHMAN

Attesting Officer      Commissioner of Patents and Trademarks